United States Patent
Rousseau

(10) Patent No.: US 7,437,465 B2
(45) Date of Patent: Oct. 14, 2008

(54) METHOD OF OPTIMIZING CALLS SET UP IN A PRIVATE TELECOMMUNICATION NETWORK INCLUDING TWO SUBNETWORKS USING THE QSIG PROTOCOL AND THE SESSION INITIALIZATION PROTOCOL, RESPECTIVELY

(75) Inventor: Olivier Rousseau, Nanterre (FR)

(73) Assignee: ALCATEL, Paris (FR)

( * ) Notice: Subject to any disclaimer, the term of this patent is extended or adjusted under 35 U.S.C. 154(b) by 813 days.

(21) Appl. No.: 10/639,452

(22) Filed: Aug. 13, 2003

(65) Prior Publication Data

US 2004/0081160 A1    Apr. 29, 2004

(30) Foreign Application Priority Data

Aug. 14, 2002    (FR) .................................. 02 10324

(51) Int. Cl.
*G06F 15/16* (2006.01)
(52) U.S. Cl. ....................................................... 709/227
(58) Field of Classification Search ......... 709/227–228; 370/352–353
See application file for complete search history.

(56) References Cited

U.S. PATENT DOCUMENTS 6,795,430 B1 * 9/2004 Ong et al. .................... 370/352

FOREIGN PATENT DOCUMENTS

EP    0876041    * 11/1998
EP    0876041 A2    11/1998
WO    WO 02/23768 A1    3/2002

OTHER PUBLICATIONS

Elwell et al., Interworking between SIP and QSIG, IETF, Jun. 2002, pp. 1-40.*
Sipping, Challenges when interworking QSIG and SIP CallTransfer (3 printouts of thread conversation), IETF, Dec. 2002.*
J. Elwell, "Interworking between SIP and QSIG", IETF Draft, 'en ligne!' Aug. 7, 2002, pp. 1-45, XP002240568.

* cited by examiner

*Primary Examiner*—Andrew Caldwell
*Assistant Examiner*—Grant Ford
(74) *Attorney, Agent, or Firm*—Sughrue Mion, PLLC

(57) ABSTRACT

A method is disclosed of optimizing calls set up in a private telecommunication network including two subnetworks using the QSIG protocol and the Session Initialization Protocol, respectively, when a first terminal belonging to the subnetwork using the SIP requests the setting up of a call with a server associated with a first switch belonging to the subnetwork using the QSIG protocol and the call must be transferred to a second terminal belonging to the subnetwork using the SIP. The two subnetworks are connected by a QSIG/SIP gateway associated with a second switch of the subnetwork using the QSIG protocol. The method conventionally sets up a first call between the first terminal and the first switch and a second call between the first switch and the second terminal and then joins the two calls in the first switch so that the first and second terminals communicate via the gateway, the first switch, and the second switch. Conventional functions of the QSIG protocol and the SIP are then used to set up a third call between the first terminal and the second terminal exclusively within the subnetwork using the SIP and then to clear down the first call and the second call.

2 Claims, 2 Drawing Sheets

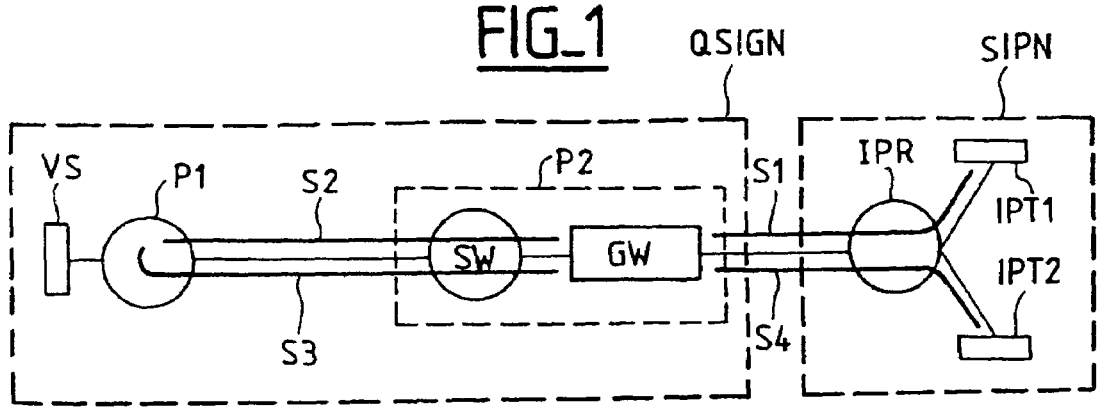
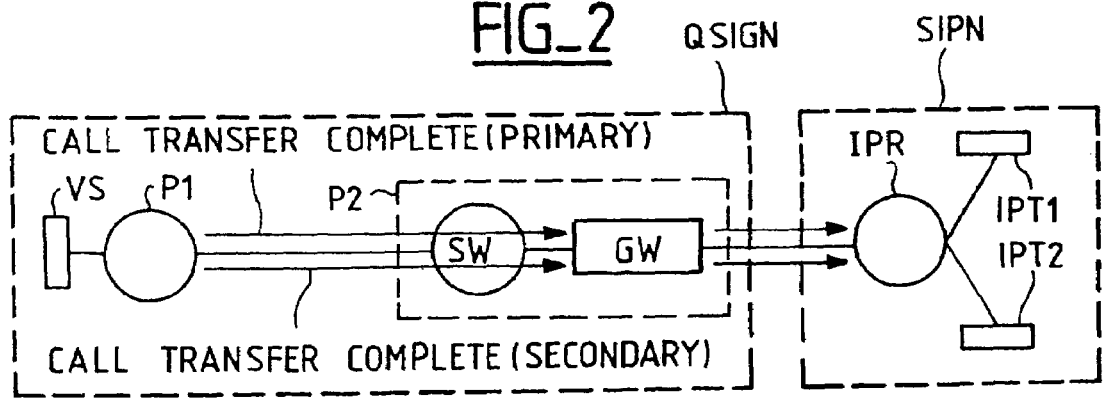
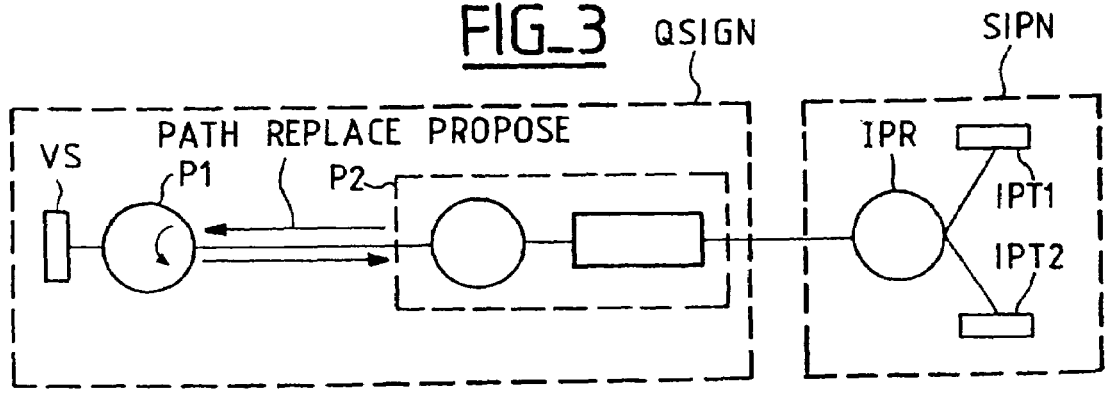

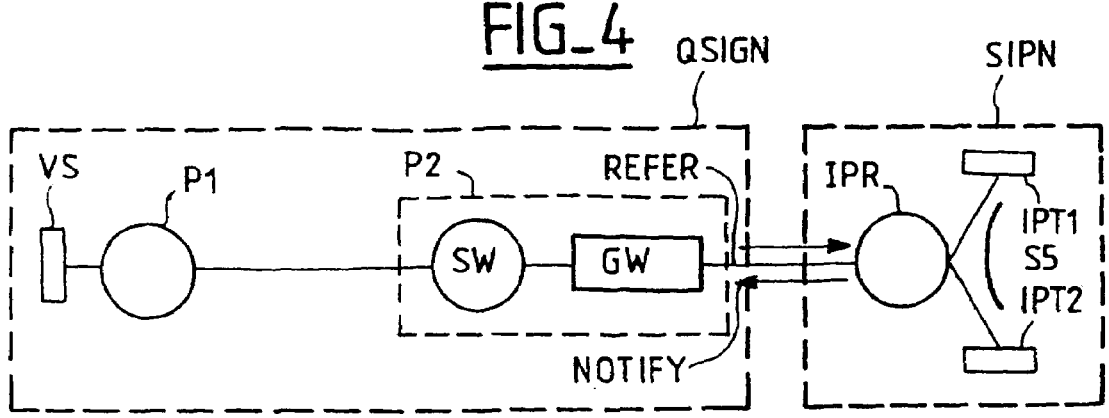
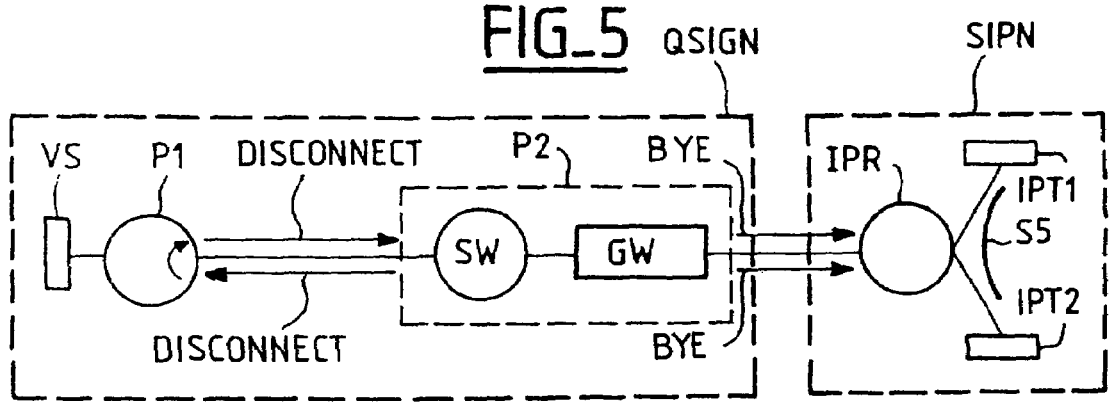
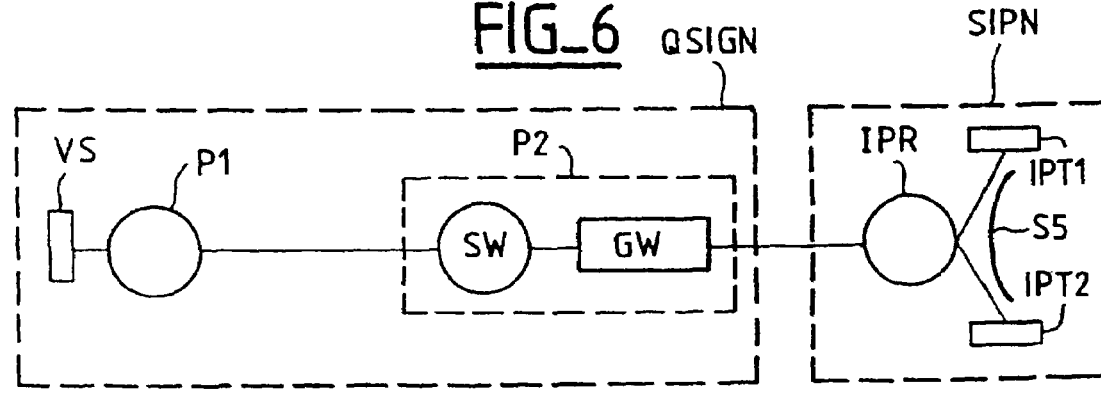

METHOD OF OPTIMIZING CALLS SET UP IN A PRIVATE TELECOMMUNICATION NETWORK INCLUDING TWO SUBNETWORKS USING THE QSIG PROTOCOL AND THE SESSION INITIALIZATION PROTOCOL, RESPECTIVELY

CROSS-REFERENCE TO RELATED APPLICATIONS

This application is based on French Patent Application No. 02 10 324 filed Aug. 14, 2002, the disclosure of which is hereby incorporated by reference thereto in its entirety, and the priority of which is hereby claimed under 35 U.S.C. §119.

BACKGROUND OF THE INVENTION

1. Field of the Invention

The invention relates to a method of optimizing calls set up in a private telecommunication network including two subnetworks using the QSIG protocol and the Session Initialization Protocol (SIP), respectively.

2. Description of the Prior Art

Conventional private networks including switches for switching circuits or packets of information transported synchronously are known in the art. The standardized QSIG signaling protocol enables the switches to exchange signaling messages, even if they are sourced from different manufacturers.

More recent private networks including routers that route packets of information (voice or data) using the Internet protocol (IP) are also known in the art. The standardized Session Initialization Protocol (SIP) enables the routers to exchange signaling messages.

Private networks including two subnetworks, one switching circuits or packets of information transported synchronously and the other routing packets of information (voice or data) using the Internet Protocol (IP) are also known in the art. The two subnetworks use the QSIG protocol and the SIP, respectively, and are connected by a gateway that handles changes of format for voice and signaling information exchanged between the two subnetworks.

FIG. 1 shows one example of the above kind of private network, which includes:
  a subnetwork QSIGN including:
    two interconnected switches P1 and P2 for switching packets of information (voice signals) transported synchronously and using the QSIG protocol to exchange signaling messages (conventional telephone terminals, not shown, are connected to these nodes);
    an interactive voice server VS connected to the switch P1 for welcoming calling users and offering in particular to transfer their call to a terminal of the private network; and
  a subnetwork SIPN including:
    an IP router (IPR) connected to the gateway GW and routing packets of information (voice or data) using the Internet Protocol (IP), the gateway handling changes of format for information exchanged between the two subnetworks QSIGN and ISPN; and
    Internet terminals IPT1 and IPT2, for example telephones, connected to the router IPR.

The switch P2 includes means SW providing the conventional switching functions and means GW constituting a QSIG/SIP gateway.

Assume that a user of the terminal IPT1 calls the terminal IPT2, which is also part of the subnetwork SIPN. The router IPR establishes a session that corresponds to a voice and signaling path connecting the terminal IPT1 directly to the terminal IPT2. There is no particular problem and the path used is the shortest possible.

Assume now that a user of the terminal IPT1 calls the voice server VS to contact an administrative department whose number he does not know, for example. The router IPR sends an SIP command to establish a session corresponding to a voice and signaling path S1-S2 from the terminal IPT1 to the switch P1 with which the voice server VS is associated. However, the SIP is operative only as far as the gateway GW integrated into the switch P2. The gateway GW translates the command from the SIP to the QSIG protocol. The SIP command establishes a first portion S1 of the voice and signaling path, this portion S1 extending from the terminal IPT1 to the gateway GW. The command translated into the QSIG protocol establishes another portion S2 of the voice and signaling path, this portion S2 extending from the gateway GW to the voice server VS. In this way a first call is set up between the terminal IPT1 and the voice server VS via the path S1-S2.

The voice server VS responds to the user of the terminal IPT1, on the same path S1-S2, and proposes a list of administrative or sales departments. The user chooses a department from the list by pressing one or more keys of the terminal IPT1. The voice server VS receives audio signals corresponding to the keys pressed and deduces, for example, that the terminal IPT1 must be connected to the terminal IPT2. It then commands the switch P1 to call the terminal IPT2 and set up a second call. Using the QSIG signaling protocol, the switch P1 commands the setting up of a voice and signaling path S3-S4 from the switch P1 to the terminal IPT2. The QSIG protocol is operative only as far as the gateway GW. The QSIG command sets up a first portion S3 of the path, this portion S3 extending from the switch P1 to the gateway GW. The gateway GW translates the command from the QSIG protocol to the SIP. The translated command commands the router IPR to create a session corresponding to a second portion S4 of the voice and signaling path, this portion S4 extending from the gateway GW to the terminal IPT2.

Finally, the voice server VS commands the switch P1 to connect the first and second calls by connecting the paths S2 and S3. The terminal IPT1 then communicates with the terminal IPT2 via the router IPR, the switch P2, the switch P1, the switch P2 again, and the router IPR.

It is therefore apparent that, if a terminal of the subnetwork SIPN has the benefit of a service offered by a server associated with a switch of the subnetwork QSIGN, the call to that server can be transferred (in some cases) to another terminal of the subnetwork SIPN on a path S1-S2-S3-S4 that is not the optimum because it includes a long detour compared to the shortest path, since the path S1-S2-S3-S4 leaves and then re-enters the subnetwork SIPN.

The object of the invention is to remedy this drawback.

SUMMARY OF THE INVENTION

The invention provides a method of optimizing calls set up in a private telecommunication network including two subnetworks using the QSIG protocol and the Session Initialization Protocol, respectively, when a first terminal belonging to the subnetwork using the SIP requests the setting up of a call with a server associated with a first switch belonging to the subnetwork using the QSIG protocol and said call must be transferred to a second terminal belonging to the subnetwork using the SIP, the two subnetworks being connected by a QSIG/SIP gateway associated with a second switch of the subnetwork using the QSIG protocol, the method consisting in conventionally establishing a first call between the first terminal and the first switch and a second call between the first switch and the second terminal and then joining the two calls in the first switch so that the first and second terminals communicate via the gateway, the first switch, and the second switch; and then using conventional functions of the QSIG protocol and the SIP to set up a third call between said first terminal and said second terminal exclusively within said subnetwork using the SIP and then to clear down said first call and said second call.

The above method provides an optimum path for the two terminals to communicate since the path that is set up for the third call does not go through switches of the network using the QSIG protocol. The method therefore economizes on the resources of that network.

The invention also provides a switch using the QSIG protocol for use in a private telecommunication network including two subnetworks using the QSIG protocol and the Session Initialization Protocol (SIP), respectively, which switch includes software means for using classic functions of the QSIG protocol as follows: when a first terminal belonging to the subnetwork using the SIP has set up a first call with a server associated with a first switch belonging to the subnetwork using the QSIG protocol and said call must be transferred to a second terminal belonging to the subnetwork using the SIP, the two subnetworks being connected by a QSIG/SIP gateway associated with a second node of the subnetwork using the QSIG protocol, and when the server has conventionally established a second call between the first switch and the second terminal and has then joined the two calls so that the first and second terminals communicate via the gateway, the first switch and the second switch command the setting up of a third call between said first terminal and said second terminal exclusively within said subnetwork using the SIP and then command clearing down said first call and said second call.

The invention will be better understood and other features will become apparent in the light of the following description and the accompanying drawings.

BRIEF DESCRIPTION OF THE DRAWINGS

FIG. 1, described above, represents one example of a private network including two subnetworks, and shows the method conventionally applied when a first terminal belonging to the network using the SIP has set up a call with a server associated with a first switch belonging to the subnetwork using the QSIG protocol and the call must be transferred to a second terminal belonging to the network using the SIP. It also shows a first portion of the method according to the invention, which portion is analogous to the conventional method.

FIGS. 2 to 6 show operations carried out successively during a second portion of the method according to the invention, the second portion consisting in using standard functions of the QSIG protocol and the SIP to set up a third call between the first and second terminals, exclusively within the subnetwork using the SIP, and then clearing down the first call and the second call.

DETAILED DESCRIPTION OF THE PREFERRED EMBODIMENT

FIG. 2 shows a first operation that consists in commanding the switch P1 (via the voice server VS) to send a QSIG signaling message "CALL TRANSFER COMPLETE (PRIMARY)" to all nodes supporting the path S2-S1 and a QSIG signaling message "CALL TRANSFER COMPLETE (SECONDARY)" to all nodes supporting the path S3-S4. These messages are standard messages of the QSIG protocol and are in the QSIG format until they reach the switch P2, where the gateway GW converts them to the SIP format before forwarding them to the router IPR.

FIG. 3 shows a subsequent second operation which consists in sending, from the switch associated with the gateway GW, i.e. the switch P2, on the path S2, a QSIG signaling message "PATH REPLACE PROPOSE". This signaling message is a conventional message of the QSIG protocol, and indicates to the nodes that it encounters on its path, in particular the switch P1, that the switch P2 wishes to optimize the path S2-S3.

The message is conventional, but software means must be provided (in addition to the conventional software means of a QSIG-compatible private switch) for the switch P2 to send this message when it receives the "CALL TRANSFER COMPLETE (PRIMARY)" message. The switch that supports the end of the path S2, i.e. the switch P1 in this example, forwards this message on the path S3 since the paths S2 and S3 are joined at the switch P1. The message therefore reaches the switch supporting the end of the path S3, i.e. the switch P2, the effect of which is to start a third operation.

FIG. 4 shows this third operation, which consists in sending, from the gateway GW of the switch P2, on the path S1, an SIP signaling message "REFER" which indicates to the node supporting the other end of the path S1, i.e. the router IPR, that the switch P2 wishes to optimize the paths S3-S4. This is a conventional SIP message. The message requests path optimization, specifying the identities IPT1 and IPT2 of the terminals that must be connected by an optimum path. This message is a conventional SIP message, but software means must be provided (in addition to the conventional software means of the QSIG compatible private switch) for the switch P2 to send the message when it receives the QSIG message "PATH REPLACE PROPOSE" over the path S3.

The router IPR responds with a conventional SIP message "NOTIFY" signifying that it has effected the requested optimization, i.e. set up a third call on a path S5 between the terminals IPT1 and IPT2 that is as direct as possible. In this simple example, the path S5 passes through only one router, namely the Internet Protocol router IPR, which is also the router providing access to the QSIG subnetwork. In other examples, the path S5 may additionally have to pass through other routers belonging to the subnetwork SIPN, but in all cases the path S5 remains exclusively within the subnetwork SIPN.

FIG. 5 shows a fifth operation which then consists in sending, from the switch P2, on the path S3, a QSIG signaling message "DISCONNECT" which requests nodes supporting the path S3 to clear down the first and second calls. This message is propagated on the path S3 and then on the path S2 which is joined to the path S3. The paths S3 and S2, and consequently the path S1, are therefore cleared down. Also, the switch P2 sends an SIP message "BYE" on the path S4. This message requests the 30 router IPR to clear down the first and second calls, i.e. to release the paths S1 and S4, by terminating the corresponding sessions.

This message is conventional in the SIP. It is sent by the gateway GW of the switch P2. Software means must be provided (in addition to the conventional software means of a QSIG compatible private switch provided with a QSIG/SIP gateway) for the switch P2 to send this message when it receives the message "DISCONNECT" over the path S2.

FIG. 6 shows the final results of the above operations: the router IPR has set up a third call by creating a new session corresponding to an optimized path S5 which connects the terminals IPT1 and IPT2 via the router IPR, without any detour via the subnetwork QSIGN. The paths S1, S2, S3, S4 are cleared down.

There is claimed:

1. A method of optimizing calls set up in a private telecommunication network including two subnetworks using the QSIG protocol and the Session Initialization Protocol (SIP), respectively, the method comprising:
    when a first terminal belonging to a SIP subnetwork has requested setting up a call with a server associated with a first switch, the server and the first switch belonging to a QSIG subnetwork connected to the SIP subnetwork via a QSIG/SIP gateway:
        establishing a first call between the first terminal and the first switch through the QSIG/SIP gateway and a second switch of the QSIG subnetwork associated with the QSIG/SIP gateway;
        establishing a second call between the first switch and a second terminal belonging to the SIP subnetwork and associated with the first switch;
        joining said first call and said second call in the first switch so that the first and second terminals communicate via the QSIG/SIP gateway, the first switch, and the second switch;
        using conventional functions of the QSIG protocol and SIP to set up a third call between the first terminal and the second terminal, exclusively within the SIP subnetwork, said setting up of said third call being initiated by at least one of said first switch and said second switch; and
        clearing down said first call and said second call.

2. A switch using the QSIG protocol for use in a private telecommunication network including two subnetworks using the QSIG protocol and the Session Initialization Protocol (SIP), respectively, which switch includes software means for using classic functions of the QSIG protocol as follows:
    when a first terminal belonging to a SIP subnetwork has set up a first call with a server associated with a first switch, the server and the first switch belonging to a QSIG subnetwork, transferring said first call to a second terminal belonging to the SIP subnetwork, the two subnetworks being connected by a QSIG/SIP gateway associated with a second node of the QSIG subnetwork, and
    when the server has conventionally established a second call between the first switch and the second terminal, and has joined said first call and said second call so that the first and second terminals communicate via the QSIG/SIP gateway, the first switch and the second switch command setting up a third call between said first terminal and said second terminal exclusively within said SIP subnetwork, and
    command clearing down said first call and said second call.

* * * * *